US 9,106,977 B2
Aug. 11, 2015

(12) United States Patent
Pace

(54) OBJECT ARCHIVAL SYSTEMS AND METHODS

(75) Inventor: Charles P. Pace, North Chittenden, VT (US)

(73) Assignee: Euclid Discoveries, LLC, Concord, MA (US)

( * ) Notice: Subject to any disclaimer, the term of this patent is extended or adjusted under 35 U.S.C. 154(b) by 265 days.

(21) Appl. No.: 13/341,437

(22) Filed: Dec. 30, 2011

(65) Prior Publication Data
US 2012/0163446 A1 Jun. 28, 2012

Related U.S. Application Data

(63) Continuation of application No. 12/522,357, filed as application No. PCT/US2008/000091 on Jan. 4, 2008, now Pat. No. 8,553,782.

(60) Provisional application No. 60/881,982, filed on Jan. 23, 2007, provisional application No. 60/881,966, filed on Jan. 23, 2007, provisional application No. 60/811,890, filed on Jun. 8, 2006.

(51) Int. Cl.
H04N 7/12 (2006.01)
H04N 11/02 (2006.01)
(Continued)

(52) U.S. Cl.
CPC ......... *H04N 21/8355* (2013.01); *H04N 19/004* (2013.01); *H04N 21/23412* (2013.01);
(Continued)

(58) Field of Classification Search
CPC ............ H04N 19/004; H04N 21/2541; H04N 21/25816
USPC .................................... 375/240.26
See application file for complete search history.

(56) References Cited

U.S. PATENT DOCUMENTS 5,117,287 A 5/1992 Koike et al.
5,710,590 A 1/1998 Ichige et al.
(Continued)

FOREIGN PATENT DOCUMENTS

EP 0 614 318 A2 9/1994
EP 1 124 379 A2 8/2001
(Continued)

OTHER PUBLICATIONS

Extended European Search Report for 06 73 3758.4, dated Mar. 8, 2011 (17 pages).
(Continued)

Primary Examiner — Jeremaiah C Hallenbeck-Huber
(74) Attorney, Agent, or Firm — Hamilton, Brook, Smith & Reynolds, P.C.

(57) ABSTRACT

Personal object based archival systems and methods are provided for processing and compressing video. By analyzing features unique to a user, such as face, family, and pet attributes associated with the user, an invariant model can be determined to create object model adapters personal to each user. These personalized video object models can be created using geometric and appearance modeling techniques, and they can be stored in an object model library. The object models can be reused for processing other video streams. The object models can be shared in a peer-to-peer network among many users, or the object models can be stored in an object model library on a server. When the compressed (encoded) video is reconstructed, the video object models can be accessed and used to produce quality video with nearly lossless compression.

34 Claims, 7 Drawing Sheets

(51) Int. Cl.
*H04N 11/04* (2006.01)
*H04N 21/8355* (2011.01)
*H04N 19/23* (2014.01)
*H04N 21/254* (2011.01)
*H04N 21/258* (2011.01)
*H04N 21/234* (2011.01)
*H04N 21/4335* (2011.01)
*H04N 21/438* (2011.01)
*H04N 21/44* (2011.01)
*H04N 21/45* (2011.01)
*H04N 21/4627* (2011.01)
*H04N 21/4788* (2011.01)
*H04N 21/63* (2011.01)
*H04N 21/845* (2011.01)

(52) U.S. Cl.
CPC ..... *H04N21/2541* (2013.01); *H04N 21/25816* (2013.01); *H04N 21/4335* (2013.01); *H04N 21/4382* (2013.01); *H04N 21/44008* (2013.01); *H04N 21/44012* (2013.01); *H04N 21/4532* (2013.01); *H04N 21/4627* (2013.01); *H04N 21/4788* (2013.01); *H04N 21/632* (2013.01); *H04N 21/8455* (2013.01)

(56) References Cited

U.S. PATENT DOCUMENTS

| | | | |
|---|---|---|---|
| 5,760,846 A | 6/1998 | Lee | |
| 5,774,591 A | 6/1998 | Black et al. | |
| 5,774,595 A | 6/1998 | Kim | |
| 5,826,165 A * | 10/1998 | Echeita et al. | 725/22 |
| 5,917,609 A | 6/1999 | Breeuwer et al. | |
| 5,933,535 A | 8/1999 | Lee et al. | |
| 5,969,755 A | 10/1999 | Courtney | |
| 5,991,447 A | 11/1999 | Eifrig et al. | |
| 6,044,168 A | 3/2000 | Tuceryan et al. | |
| 6,061,400 A | 5/2000 | Pearlstein et al. | |
| 6,088,484 A * | 7/2000 | Mead | 382/232 |
| 6,256,423 B1 | 7/2001 | Krishnamurthy et al. | |
| 6,307,964 B1 | 10/2001 | Lin et al. | |
| 6,546,117 B1 | 4/2003 | Sun et al. | |
| 6,574,353 B1 | 6/2003 | Schoepflin | |
| 6,608,935 B2 | 8/2003 | Nagumo et al. | |
| 6,611,628 B1 | 8/2003 | Sekiguchi et al. | |
| 6,625,310 B2 | 9/2003 | Lipton et al. | |
| 6,625,316 B1 | 9/2003 | Maeda | |
| 6,661,004 B2 | 12/2003 | Aumond et al. | |
| 6,711,278 B1 | 3/2004 | Gu et al. | |
| 6,731,799 B1 | 5/2004 | Sun et al. | |
| 6,731,813 B1 | 5/2004 | Stewart | |
| 6,738,424 B1 * | 5/2004 | Allmen et al. | 375/240.08 |
| 6,751,354 B2 | 6/2004 | Foote et al. | |
| 6,774,917 B1 | 8/2004 | Foote et al. | |
| 6,792,154 B1 | 9/2004 | Stewart | |
| 6,870,843 B1 | 3/2005 | Stewart | |
| 6,909,745 B1 | 6/2005 | Puri et al. | |
| 6,912,310 B1 | 6/2005 | Park et al. | |
| 6,925,122 B2 | 8/2005 | Gorodnichy | |
| 6,950,123 B2 | 9/2005 | Martins | |
| 7,003,117 B2 | 2/2006 | Kacker et al. | |
| 7,027,599 B1 | 4/2006 | Entwistle | |
| 7,043,058 B2 | 5/2006 | Cornog et al. | |
| 7,088,845 B2 | 8/2006 | Gu et al. | |
| 7,158,680 B2 | 1/2007 | Pace | |
| 7,162,055 B2 | 1/2007 | Gu et al. | |
| 7,162,081 B2 | 1/2007 | Timor et al. | |
| 7,164,718 B2 | 1/2007 | Maziere et al. | |
| 7,173,925 B1 | 2/2007 | Dantu et al. | |
| 7,184,073 B2 | 2/2007 | Varadarajan et al. | |
| 7,352,386 B1 | 4/2008 | Shum et al. | |
| 7,356,082 B1 | 4/2008 | Kuhn | |
| 7,415,527 B2 | 8/2008 | Varadarajan et al. | |
| 7,424,157 B2 | 9/2008 | Pace | |
| 7,424,164 B2 | 9/2008 | Gondek et al. | |
| 7,426,285 B2 | 9/2008 | Pace | |
| 7,436,981 B2 | 10/2008 | Pace | |
| 7,457,435 B2 | 11/2008 | Pace | |
| 7,457,472 B2 | 11/2008 | Pace et al. | |
| 7,508,990 B2 | 3/2009 | Pace | |
| 7,574,406 B2 | 8/2009 | Varadarajan et al. | |
| 7,606,305 B1 | 10/2009 | Rault | |
| 7,630,522 B2 | 12/2009 | Popp et al. | |
| 7,715,597 B2 | 5/2010 | Costache et al. | |
| 7,788,191 B2 | 8/2010 | Jebara | |
| 8,019,170 B2 | 9/2011 | Wang | |
| 8,036,464 B2 | 10/2011 | Sridhar et al. | |
| 8,065,302 B2 | 11/2011 | Sridhar et al. | |
| 8,068,677 B2 | 11/2011 | Varadarajan et al. | |
| 8,086,692 B2 | 12/2011 | Sridhar et al. | |
| 8,090,670 B2 | 1/2012 | Sridhar et al. | |
| 8,140,550 B2 | 3/2012 | Varadarajan et al. | |
| 8,243,118 B2 | 8/2012 | Pace | |
| 8,259,794 B2 | 9/2012 | Bronstein et al. | |
| 8,290,038 B1 | 10/2012 | Wang et al. | |
| 2001/0038714 A1 | 11/2001 | Masumoto et al. | |
| 2002/0016873 A1 | 2/2002 | Gray et al. | |
| 2002/0054047 A1 | 5/2002 | Toyama et al. | |
| 2002/0059643 A1 | 5/2002 | Kitamura et al. | |
| 2002/0073109 A1 | 6/2002 | Toriumi | |
| 2002/0085633 A1 | 7/2002 | Kim et al. | |
| 2002/0164068 A1 | 11/2002 | Yan | |
| 2002/0196328 A1 | 12/2002 | Piotrowski | |
| 2003/0011589 A1 | 1/2003 | Desbrun et al. | |
| 2003/0058943 A1 | 3/2003 | Zakhor et al. | |
| 2003/0063778 A1 * | 4/2003 | Rowe et al. | 382/115 |
| 2003/0103647 A1 | 6/2003 | Rui et al. | |
| 2003/0122966 A1 | 7/2003 | Markman et al. | |
| 2003/0163690 A1 | 8/2003 | Stewart | |
| 2003/0194134 A1 | 10/2003 | Wenzel et al. | |
| 2003/0206589 A1 | 11/2003 | Jeon | |
| 2003/0231769 A1 * | 12/2003 | Bolle et al. | 380/210 |
| 2003/0235341 A1 | 12/2003 | Gokturk et al. | |
| 2004/0013286 A1 | 1/2004 | Viola et al. | |
| 2004/0022320 A1 | 2/2004 | Kawada et al. | |
| 2004/0107079 A1 | 6/2004 | MacAuslan | |
| 2004/0135788 A1 | 7/2004 | Davidson et al. | |
| 2004/0246336 A1 | 12/2004 | Kelly, III et al. | |
| 2004/0264574 A1 | 12/2004 | Lainema | |
| 2005/0015259 A1 | 1/2005 | Thumpudi et al. | |
| 2005/0185823 A1 * | 8/2005 | Brown et al. | 382/103 |
| 2005/0193311 A1 | 9/2005 | Das et al. | |
| 2006/0013450 A1 | 1/2006 | Shan et al. | |
| 2006/0029253 A1 | 2/2006 | Pace | |
| 2006/0045185 A1 | 3/2006 | Kiryati | |
| 2006/0067585 A1 | 3/2006 | Pace | |
| 2006/0133681 A1 | 6/2006 | Pace | |
| 2006/0177140 A1 | 8/2006 | Pace | |
| 2006/0233448 A1 | 10/2006 | Pace et al. | |
| 2006/0274949 A1 | 12/2006 | Gallagher et al. | |
| 2007/0025373 A1 | 2/2007 | Stewart | |
| 2007/0071336 A1 | 3/2007 | Pace | |
| 2007/0153025 A1 | 7/2007 | Mitchell et al. | |
| 2007/0183661 A1 | 8/2007 | El-Maleh et al. | |
| 2007/0185946 A1 | 8/2007 | Basri et al. | |
| 2008/0027917 A1 | 1/2008 | Mukherjee et al. | |
| 2008/0040375 A1 | 2/2008 | Vo et al. | |
| 2008/0101652 A1 | 5/2008 | Zhao et al. | |
| 2008/0232477 A1 | 9/2008 | Wang et al. | |
| 2008/0240247 A1 | 10/2008 | Lee et al. | |
| 2009/0040367 A1 | 2/2009 | Zakrzewski et al. | |
| 2009/0067719 A1 | 3/2009 | Sridhar et al. | |
| 2009/0112905 A1 | 4/2009 | Mukerjee et al. | |
| 2009/0129474 A1 | 5/2009 | Pandit et al. | |
| 2009/0158370 A1 | 6/2009 | Li et al. | |
| 2009/0262804 A1 | 10/2009 | Pandit et al. | |
| 2009/0292644 A1 | 11/2009 | Varadarajan et al. | |
| 2010/0008424 A1 | 1/2010 | Pace | |
| 2010/0027861 A1 | 2/2010 | Shekhar et al. | |
| 2010/0049739 A1 | 2/2010 | Varadarajan et al. | |
| 2010/0073458 A1 | 3/2010 | Pace | |
| 2010/0074600 A1 | 3/2010 | Putterman et al. | |
| 2010/0086062 A1 | 4/2010 | Pace | |

(56) References Cited

U.S. PATENT DOCUMENTS

| | | |
|---|---|---|
| 2010/0088717 A1 | 4/2010 | Candelore et al. |
| 2010/0167709 A1 | 7/2010 | Varadarajan |
| 2010/0272185 A1 | 10/2010 | Gao et al. |
| 2010/0278275 A1 | 11/2010 | Yang et al. |
| 2011/0055266 A1 | 3/2011 | Varadarajan et al. |
| 2011/0058609 A1 | 3/2011 | Chaudhury et al. |
| 2011/0087703 A1 | 4/2011 | Varadarajan et al. |
| 2011/0182352 A1 | 7/2011 | Pace |
| 2011/0286627 A1 | 11/2011 | Takacs et al. |
| 2012/0155536 A1 | 6/2012 | Pace |
| 2012/0281063 A1 | 11/2012 | Pace |
| 2013/0083854 A1 | 4/2013 | Pace |
| 2013/0107948 A1 | 5/2013 | DeForest et al. |
| 2013/0170541 A1 | 7/2013 | Pace et al. |
| 2013/0230099 A1 | 9/2013 | DeForest et al. |

FOREIGN PATENT DOCUMENTS

| | | |
|---|---|---|
| EP | 1 426 898 A2 | 6/2004 |
| EP | 1 779 294 A2 | 5/2007 |
| JP | 2003-253190 | 11/1991 |
| JP | 5-244585 A | 9/1993 |
| JP | 07-038873 | 2/1995 |
| JP | 2007-095587 | 4/1995 |
| JP | 07-288789 | 10/1995 |
| JP | 08-235383 | 9/1996 |
| JP | 08-263623 | 10/1996 |
| JP | 2001-100731 A | 4/2001 |
| JP | 2001-103493 A | 4/2001 |
| JP | 2002-525735 T | 8/2002 |
| JP | 2004-94917 A | 3/2004 |
| JP | 2004 356747 | 12/2004 |
| JP | 2006-521048 A | 9/2006 |
| TW | 200521885 | 7/2005 |
| TW | 200527327 | 8/2005 |
| WO | WO 98/27515 | 6/1998 |
| WO | WO 98/59497 A1 | 12/1998 |
| WO | WO 99/26415 | 5/1999 |
| WO | WO 00/16563 | 3/2000 |
| WO | WO 00/45600 | 8/2000 |
| WO | WO02 102084 A1 | 12/2002 |
| WO | WO 03/041396 A1 | 5/2003 |
| WO | WO 2005/055602 A1 | 6/2005 |
| WO | WO 2005/107116 A2 | 11/2005 |
| WO | WO 2006/015092 A2 | 2/2006 |
| WO | WO 2006/034308 A2 | 3/2006 |
| WO | WO 2006/055512 A2 | 5/2006 |
| WO | WO 2006/083567 A1 | 8/2006 |
| WO | WO 2006/105470 A1 | 10/2006 |
| WO | WO 2007/007257 A1 | 1/2007 |
| WO | WO 2007/146102 A2 | 12/2007 |
| WO | WO 2008/091483 A2 | 7/2008 |
| WO | WO 2008/091484 A2 | 7/2008 |
| WO | WO 2008/091485 A2 | 7/2008 |
| WO | WO 2010/042486 A1 | 4/2010 |
| WO | WO 2010/118254 | 10/2010 |
| WO | WO 2011/156250 A1 | 12/2011 |
| WO | WO 2012/033970 A1 | 3/2012 |

OTHER PUBLICATIONS

Extended European Search Report for 06 74 0318.8, dated May 6, 2011 (14 pages).

Notification Concerning Transmittal of International Preliminary Report on Patentability, in International Application No. PCT/US2008/000092, pp. 9, mailed Aug. 6, 2009.

Notification Concerning Transmittal of International Preliminary Report on Patentability, in International Application No. PCT/US2008/000091, pp. 9, mailed Aug. 6, 2009.

Jones, M. and P. Viola, "Fast Multi View Face Detection," *Mitsubishi Electrical Laboratories*, Jul. 2003 (10 pp.).

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511 518.

Gunsel, B. et al., "Content based access to video objects: Temporal segmentation, visual summarization, and feature extraction," *Signal Processing*, vol. 66, pp. 261 280 (1998).

Piamsa nga, P. and N. Babaguchi, "Motion estimation and detection of complex object by analyzing resampled movements of parts," in *Proc. ICIP '04*, 1 (365 368), Oct. 2004.

Vidal, R. et al., "Generalized principal component analysis (GPCA)", in *Proc. CVPR '03*, 1 (I621-628), Jun. 2003.

Vidal, R. and R. Hartley, "Motion segmentation with missing data using PowerFactorization and GPCA," in *Proc. CVPR* 04, 2 (II-310-316), Jun.-Jul. 2004.

Huang, R. et al., "Sparse representation of images with hybrid linear models," in *Proc. ICIP '04*, 2(1281 1284) Oct. 2004.

Rong, S. et al., "Efficient spatiotemporal segmentation and video object generation for highway surveillance video," in *Proc. IEEE Int'l, Conf. Communications, Circuits and Systems and West Sino Expositions*, 1(580 584), Jun. Jul. 2002.

Toklu, C. et al., "Simultaneous Alpha Map Generation and 2 D Mesh Tracking for Multimedia Applications," *Proceedings of the International Conference on Image Processing: 1997*, (113 116) (Oct. 1997).

Urban, M., "Harris Interest Operator," Jan. 28, 2003, http://cmp.felk.cvut.cz/cmp/courses/dzo/resources/lecture_harris_urban.pdf (23 pp.).

Rehg, J. M. and Witkin, A. P., "Visual Tracking with Deformation Models," *Proc. IEEE Int '1. Conf. on Robotics and Automation*, pp. 844-850 (Apr. 1991).

Kass, Michael, Andrew Witzin, and Demetri Terzopoulos, "Snakes: Active contour Models," *International Journal of Computer Vision* (1988).

Tao, H., et al., "Compression of MPEG-4 Facial Animation Parameters for Transmission of Talking Heads," *IEEE Transactions on Circuits and Systems for Video Technology*, vol. 9, No. 2, pp. 264-276 (Mar. 1999).

Reinders, M.J.T., et al., "Facial Feature Localization and Adaptation of a Generic Face Model for model-Based Coding," *Signal Processing: Image Communication*, No. 7, pp. 57-74 (1995).

Doenges, P. K., "MPEG-4: Audio/Video and Synthetic Graphics/Audio for Mixed Media," *Signal Processing: Image Communication*, No. 9, pp. 433-463 (1997).

PCT International Search Report, for International Application No. PCT/US2008/000091, dated Sep. 23, 2008, 5 pages.

PCT International Search Report, for International Application No. PCT/US2008/000092, dated Sep. 23, 2008, 5 pages.

Antoszczyszyn, P.M., et al., "Tracking of the Motion of Important Facial Features in Model-Based Coding," *Signal Processing*, 66(2):249-260, (Apr. 30, 1998).

Fukuhara, T., et al., "3-D Motion Estimation of Human Head for Model-Based Image Coding," *IEEE Proceedings—I*, 140(1):26-35, (Feb. 1, 1993).

International Search Report for International Application No. PCT/US2009/059653, 8 pp., mailed Feb. 2, 2010.

Written Opinion of the International Searching Authority for International Application No. PCT/US2009/059653, 8 pp., mailed Feb. 2, 2010.

Notification of Transmittal of the International Search Report and the Written Opinion of the International Searching Authority, or the Declaration, for International Application No. PCT/US2008/000090, 19 pp., mailed Aug. 18, 2010.

Invitation to Pay Additional Fees and, Where Applicable, Protest Fee, for International Application No. PCT/US2008/000090, mailed Jun. 2, 2010.

Notification Concerning Transmittal of International Preliminary Report on Patentability (Chapter I of the Patent Cooperation Treaty), for International Application No. PCT/US2008/00090, mailed Sep. 2, 2010.

Amit, Yali, *2D Object Detection and Recognition: Models, Algorithms, and Networks*, The MIT Press, Cambridge, Massachusetts, pp. 147-149 (Sections 7.3: Detecting Pose and 7.4: Bibliographical Notes and Discussion) (2002).

Huang, T.S. et al., "Chapter 5: Three-Dimensional Model-Based Image Communication," *Visual Information Representation, Com-*

(56) References Cited

OTHER PUBLICATIONS

*munication, and Image Processing*, Editors: Chen, Chang Wen, et al., Marcel Dekker, Inc., New York, New York, pp. 97-117 (1999).
Notification Concerning Transmittal of the International Preliminary Report on Patentability for PCT/US2009/059653, mailed Apr. 21, 2011 (10 pages).
Viola, P. and Jones, M.J., "Robust Real-Time Face Detection," International Journal of Computer Vision, 20(17):138-153 (2004).
Bay, H., et al., "SURF: Speeded Up Robust Features", ETH Zurich {bay, vangool}@vision.ee.ethz.ch, 1-14 (Date Not Provided).
Lowe, D.G., "Distinctive Tillage Features from Scale-Invariant Keypoints", International Journal of Computer Vision, 1-28 (2004).
Pati, Y.C., et al., "Orthogonal Matching Pursuit: Recursive Function Approximation with Applications to Wavelet Decomposition", 27th Annual Asilomar conference on Signals systems and Computers ,1-5 (1993).
Wiegand, T., et al., "Overview of the H.264/AVC Video Coding Standard", IEEE Transactions on Circuits and Systems for Video Technology, 13(7):560-576 (2003).
"Series H: Audiovisual and Multimedia Systems: Infrastructure of audiovisual services—Coding of moving video; Advanced video coding for generic audiovisual services", ITU-T, H.264: 1-657 (2012).
Garrett-Glaser, J., "Diary of an x264 Developer", http://x264dev.multimedia.cx/, 1-7 (2008).
Brenneman, A., et al., "x264", Wikipedia—The Free Encyclopedia: http:.//en.wikipedia,org/wiki/X264, 1-5 (Date Not Provided).
"H.264/MPEG-4 AVC", Wikipedia—The Free Encyclopedia: http:.//en.wikipedia,org/wiki/X264, 1-17 (Date Not Provided).
OpenCV Documentation Page, http://docs.opencv.org/ (Retrieved on Dec. 21, 2012).
Intel Integrated Performance Primitives—Documentation, http://software.intel.com/en-us/articles/intel-integrated-performance-primitives-documentation/ (Retrieved on Dec. 21, 2012).
"Bit-Torrent: Introduction", Retrieved on: Jan. 18, 2006, retrieved online at: http://web.archive.org/web/20060118042451/http://www.bittorrent.com/introduction.html.
Extended European Search Report for 06 73 3758.4, entitled: Apparatus and Method for Processing Video Data, dated Mar. 8, 2011 (17 pages).
Extended European Search Report for 06 74 0318.8, entitled: Apparatus and Method for Processing Video Data, dated May 6, 2011 (14 pages).
Fischler, M.A., et al., "Random Sample Consensus: A Paradigm for Model Fitting with Applications to Image Analysis and Automated Cartography," Communications of the Association for Computing Machinery, 24(6):381-395 (1981).
Harris, C., et al., "A Combined Corner nad Edge Detector," Alvey Vision Conference, Proceedings of the Alvey Vision Conference, p. 147 (1988).
Irani, M., et al., "Detecting and Tracking Multiple Moving Objects Using Temporal Integration," European Conference on Computer Vision, 282-287 (1992).
Park, et al., "Qualitative Estimation of Camera Motion Parameters From the Linear Composition of Optical Flow," Pattern Recognition: The Journal of the Pattern Recognition Society, 37:767-779 (2004).
Pique, R. et al., "Efficient Face Coding in Video Sequences Combining Adaptive Principal Component Analysis and a Hybrid Codec Approach," Proceedings of International Conference on Acoustics, Speech and Signal Processing, 3:629-632(2003).
Schröder, K., et al., "Combined Description of Shape and Motion in an Object Based Coding Scheme Using Curved Triangles," Proceedings of the International Conference on Image Processing, 2:390-393 (1995).
Tabatabai, A. J., et al., "Motion Estimation Methods for Video Compression—A Review," Journal of the Franklin Institute, 335(8): 1411-1441 (1998).
Wang, Y., "Use of Two-Dimensional Deformable Mesh Structures for Video Coding, Part I—The Synthesis Problem: Mesh-Based Function Approximation and Mapping" IEEE Transactions on Circuits and Systems for Video Technology, 6(6):1051-8215 (1996).
Wang, Y., "Use of Two-Dimensional Deformable Mesh Strucutures for Video Coding, Part II—The Analysis Problem and a Region-Based Coder Employing an Active Mesh Representation" IEEE Transactions on Circuits and Systems for Video Technology, 6(6):1051-8215 (1996).
Shin, J. et al., "Optical flow-based real-time object tracking using non-prior training active feature model," Academic Press Limited, GB, vol. 11, No. 3, pp. 204-218 (Jun. 1, 2005).
Cho, J-H., et al., "Object detection using multi-resolution mosaic in image sequences," Signal Processing. Image Communication, Elsevier Science Publishers, Amsterdam, vol. 20, No. 3, pp. 233-253, (Mar. 1, 2005).
Gorodinchy, et al., "Seeing faces in video by computers. Editorial for Special Issue on Face Processing in Video Sequences," Image and Vision Computing, Guilford, GB, vol. 24, No. 6, pp. 551-556 (Jun. 1, 2006).
Miners, B. W., et al., "Dynamic Facial Expression Recognition Using Fuzzy Hidden Markov Models," Systems, Man and Cybernetics, 2005 IEEE International Conference on, IEEE, Piscataway, N.J., USA, vol. 2, pp. 1417-1422 (Oct. 10, 2005).
Notification Concerning Transmittal of International Preliminary Report on Patentability, in International Application No. PCT/US2008/000092, entitled: Systems and Methods for Providing Personal Video Services, pp. 9, mailed Aug. 6, 2009.
Dodgson, N. A., "Image resampling," Technical Report, UCAM-CL-TR-261, ISSN 1476-2986, University of Cambridge, Computer Laboratory, (264 pp.) (Aug. 1992).
Richardson, I., "Vcodex White Paper: Video Compression Patents," Vcodex Ltd., pp. 3-6 (2008-2011).
Office Action from U.S. Appl. No. 12/522,357, dated Dec. 12, 2012.
Office Action from U.S. Appl. No. 12/522,322, dated Dec. 11, 2012.
Notification and Transmittal of International Search Report and Written Opinion dated Jun. 10, 2013 for PCT/US2013/029297, entitled "Video Compression Repository and Model Reuse".
Zhang, et al., "A Novel Video Coding Framework by Perceptual Representation and Macroblock-Based Matching Pursuit Algorithm", *Department of Computer Science and Technology*, pp. 322-331 (2007).
Osama, et al., "Video Compression Using Matching Pursuits", *IEEE Transactions on Circuits and Systems for Video Technology*, vol. 9, No. 1, Feb. 1999.
Neff, et al., "Matching-Pursuit Based Video Compression", *Department of Electrical Engineering and Computer Science*, MPEG Meeting, Mar. 11, 1995.
Notice of Allowance from U.S. Appl. No. 12/522,357 dated Aug. 15, 2013.
Ebrahimi, T., et al. "MPEG-4 natural video coding—An Overview", Signal Processing: Image Communication 15:365-385 (2000).
Keysers, et al., "Deformation Models for Image Recognition," IEEE Transactions on Pattern Analysis and Machine Intelligence, 29(8):1422-1435 (2007).
Office Action from U.S. Appl. No. 13/121,904, dated May 29, 2013.
Preliminary Examination Report dated Sep. 12, 2013, for Taiwan Application No. 097100679, entitled "Object Archival Systems and Methods."
Final Office Action from U.S. Appl. No. 12/522,322, dated Aug. 14, 2013.
Office Action from U.S. Appl. No. 13/121,904, dated Oct. 23, 2013.
Office Action from U.S. Appl. No. 13/772,230, dated Oct. 18, 2013.
Notification of Transmittal of International Search Report and Written Opinion dated Oct. 16, 2013 for PCT/US2013/043884, entitled "Standards-Compliant Model-Based Video Encoding and Decoding."
Jolliffe, I.T., "Principal Component Analysis, Second Edition," Springer, 518 pp., Apr. 2002.

* cited by examiner

OBJECT ARCHIVAL SYSTEMS AND METHODS

RELATED APPLICATIONS

This application is a continuation of U.S. application Ser. No. 12/522,357, filed Jul. 7, 2009, now U.S. Pat. No. 8,553,782; which is the U.S. National Stage of International Application No. PCT/US2008/000091, filed Jan. 4, 2008, which designates the U.S., published in English, and claims the benefit of U.S. Provisional Application No. 60/881,982 filed Jan. 23, 2007. This application is related to U.S. Provisional Application No. 60/881,966, titled "Computer Method and Apparatus for Processing Image Data," filed Jan. 23, 2007, U.S. Provisional Application No. 60/811,890, titled "Apparatus And Method For Processing Video Data," filed Jun. 8, 2006. This application is related to U.S. application Ser. No. 11/396,010 filed Mar. 31, 2006, which is a continuation-in-part of U.S. application Ser. No. 11/336,366 filed Jan. 20, 2006, which is a continuation-in-part of U.S. application Ser. No. 11/280,625 filed Nov. 16, 2005, which is a continuation-in-part of U.S. application Ser. No. 11/230,686, filed Sep. 20, 2005, which is a continuation-in-part of U.S. application Ser. No. 11/191,562, filed Jul. 28, 2005, now U.S. Pat. No. 7,158,680. The entire teachings of the above applications are incorporated herein by reference.

BACKGROUND

With the recent surge in popularity of digital video, the demand for video compression has increased dramatically. Video compression reduces the number of bits required to store and transmit digital media. Video data contains spatial and temporal redundancy, and these spatial and temporal similarities can be encoded by registering differences within a frame (spatial) and between frames (temporal). The hardware or software that performs compression is called a codec (coder/decoder). The codec is a device or software capable of performing encoding and decoding on a digital signal. As data-intensive digital video applications have become ubiquitous, so has the need for more efficient ways to encode signals. Thus, video compression has now become a central component in storage and communication technology.

Unfortunately, conventional video compression schemes suffer from a number of inefficiencies, which manifest in the form of slow data communication speeds, large storage requirements, and disturbing perceptual effects. These impediments can impose serious problems to a variety of users who need to manipulate video data easily, efficiently, while retaining quality, which is particularly important in light of the innate sensitivity people have to some forms of visual information.

In video compression, a number of critical factors are typically considered including: video quality and the bit rate, the computational complexity of the encoding and decoding algorithms, robustness to data losses and errors, and latency. As an increasing amount of video data surges across the Internet, not just to computers but also televisions, cell phones and other handheld devices, a technology that could significantly relieve congestion or improve quality represents a significant breakthrough.

SUMMARY

Systems and methods for processing video are provided to create computational and analytical advantages over existing state-of-the-art methods. A video signal can be processed to create object models from one or more objects represented in the video signal. The object models can be archived. The archived object models can be used as a library of object models for structure, deformation, appearance, and illumination modeling. One or more of the archived object models can be used when processing a compressed video file. The one or more archived object models and a codec can be used to reconstruct the compressed video file. The object models can be used to create an implicit representation of one or more of the objects represented in the video signal.

The object models in the archive can be compared to determine whether there are substantially equivalent object models stored in the archive. The size of the archive can be reduced by eliminating redundant object models that are substantially equivalent to each other. Object models in the archive that are similar can be combined.

A video codec can be used to reconstruct the compressed video file. The object models can be stored separately from the video codec. The object models can be included or bundled with the video codec. A customized codec can be created by grouping several of the object models. The customized codec can be optimized to reconstruct the compressed video file.

The compressed video file can be associated with a group of other compressed video files having similar features. The customized codec can be optimized to reconstruct any of the compressed video files in this group. The group of compressed video files can be determined based on personal information about a user. The personal information about a user can be determined by analyzing uncompressed video files provided by the user. When the uncompressed video files provided by the user are analyzed, reoccurring objects depicted in the uncompressed video files provided by the user can be identified. The reoccurring objects, for example, can be particular human faces or animals identified in the uncompressed video files provided by the user. Customized object models can be created that are trained to reconstruct those reoccurring objects. The customized objects can be used to create a customized codec for reconstructing the compressed video file.

The compressed video file can be sent from one user computer to another. While this compressed video file is being reconstructed, the archived object models can be accessed from a server. The server can be used to maintain and mine the archived object models for a plurality of users. The server can create an object model library. In this way, a video processing service can be provided, where members of the service can store their object models on the server, and access the object models remotely from the server to reconstruct their compressed video files.

The archived object models can be shared among a plurality of user computers in a peer-to-peer network. A request for the compressed video file from one computer in the peer-to-peer network can be received. In response to the request, one of the archived object models can be sent from a different user computer in the peer-to-peer network. Also in response to the request, another one of the archived object models can be sent from yet another computer in the peer-to-peer network. Further in response to the request, another one of the archived object models, or a sub-partitioning of those models can be sent from yet another user computer in the peer-to-peer network. In this way, the archived object models can be maintained and disseminated using a distributed approach.

One or more of object models can be used to control access to the compressed video stream. The object models can be used with a codec to reconstruct the compressed video file. The video file may not be reconstructed or rendered on a user's computer without using one or more of the object models. By controlling access to the object models, access (e.g. playback access) of the compressed video file can be controlled. The object models can be used as a key to access the video data. The playback operation of the coded video data can depend on the object models. This approach makes the compressed video data unreadable without access to the object models. In this way, the object models can be used as a form of encryption and digital rights management. Different quality object models can be used to provide different quality levels of the decompressed video from the same video file. This allows for a differential decoding of a common video file. (e.g. a Standard Definition and High Definition version of the video based on the object model used and a common video file).

One or more of the object models can include advertisements that cause ads to be inserted into the reconstructed video stream upon playback. For example, during reconstruction (e.g. playback) of the encoded video, the models can cause frames that provide advertisement to be generated into the playback video stream.

A software system for processing video can be provided. An encoder can process a video signal to create object models for one or more objects represented in the video signal. An object library can store the object models. A decoder can use a codec and one or more of the archived object models from the object library when reconstructing a coded video file.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
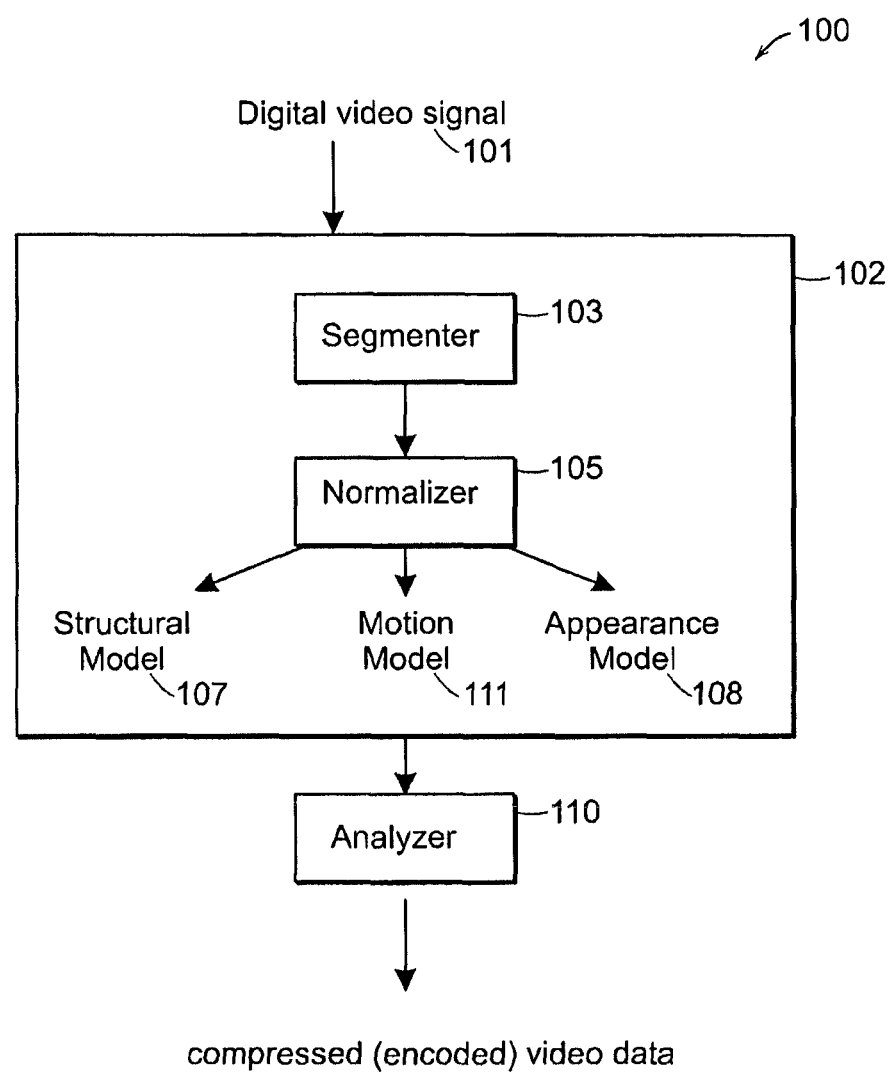
FIG. 1 is a block diagram of a video compression (image processing, generally) system employed in embodiments of the present invention.

A description of example embodiments of the invention follows.

Creating Object Models

In video signal data, frames of video are assembled into a sequence of images. The subject of the video is usually a three-dimensional scene projected onto the camera's two-dimensional imaging surface. In the case of synthetically generated video, a "virtual" camera is used for rendering; and in the case of animation, the animator performs the role of managing this camera frame of reference. Each frame, or image, is composed of picture elements (pels) that represent an imaging sensor response to the sampled signal. Often, the sampled signal corresponds to some reflected, refracted, or emitted energy, (e.g. electromagnetic, acoustic, etc.) sampled through the camera's components on a two dimensional sensor array. A successive sequential sampling results in a spatiotemporal data stream with two spatial dimensions per frame and a temporal dimension corresponding to the frame's order in the video sequence. This process is commonly referred to as the "imaging" process.

The invention provides a means by which video signal data can be efficiently processed into one or more beneficial representations. The present invention is efficient at processing many commonly occurring data sets in the video signal. The video signal is analyzed, and one or more concise representations of that data are provided to facilitate its processing and encoding. Each new, more concise data representation allows reduction in computational processing, transmission bandwidth, and storage requirements for many applications, including, but not limited to: encoding, compression, transmission, analysis, storage, and display of the video signal. Noise and other unwanted parts of the signal are identified as lower priority so that further processing can be focused on analyzing and representing the higher priority parts of the video signal. As a result, the video signal can be represented more concisely than was previously possible. And the loss in accuracy is concentrated in the parts of the video signal that are perceptually unimportant.

As described in U.S. application Ser. No. 11/336,366 filed Jan. 20, 2006 and U.S. application Ser. No. 61/881,966, titled "Computer Method and Apparatus for Processing Image Data," filed Jan. 23, 2007, the entire teachings of which are incorporated by reference, video signal data is analyzed and salient components are identified. The analysis of the spatiotemporal stream reveals salient components that are often specific objects, such as faces. The identification process qualifies the existence and significance of the salient components, and chooses one or more of the most significant of those qualified salient components. This does not limit the identification and processing of other less salient components after or concurrently with the presently described processing. The aforementioned salient components are then further analyzed, identifying the variant and invariant subcomponents. The identification of invariant subcomponents is the process of modeling some aspect of the component, thereby revealing a parameterization of the model that allows the component to be synthesized to a desired level of accuracy.

In one embodiment, the PCA/wavelet encoding techniques are applied to a preprocessed video signal to form a desired compressed video signal. The preprocessing reduces complexity of the video signal in a manner that enables principal component analysis (PCA)/wavelet encoding (compression) to be applied with increased effect. PCA/wavelet encoding is discussed at length in co-pending application, U.S. application Ser. No. 11/336,366 filed Jan. 20, 2006 and U.S. application Ser. No. 61/881,966, titled "Computer Method and Apparatus for Processing Image Data," filed Jan. 23, 2007.

FIG. 1 is a block diagram of an example image processing system 100 embodying principles of the present invention. A source video signal 101 is input to or otherwise received by a preprocessor 102. The preprocessor 102 uses bandwidth consumption or other criteria, such as a face/object detector to determine components of interest (salient objects) in the source video signal 101. In particular, the preprocessor 102 determines portions of the video signal which use disproportionate bandwidth relative to other portions of the video signal 101. One method related to the segmenter 103 for making this determination is as follows.

Segmenter 103 analyzes an image gradient over time and/or space using temporal and/or spatial differences in derivatives of pels. For purposes of coherence monitoring, parts of the video signal that correspond to each other across sequential frames of the video signal are tracked and noted. The finite differences of the derivative fields associated with those coherent signal components are integrated to produce the determined portions of the video signal which use disproportionate bandwidth relative to other portions (i.e., determines the components of interest). In a preferred embodiment, if a spatial discontinuity in one frame is found to correspond to a spatial discontinuity in a succeeding frame, then the abruptness or smoothness of the image gradient is analyzed to yield a unique correspondence (temporal coherency). Further, collections of such correspondences are also employed in the same manner to uniquely attribute temporal coherency of discrete components of the video frames. For an abrupt image gradient, an edge is determined to exist. If two such edge defining spatial discontinuities exist then a corner is defined. These identified spatial discontinuities are combined with the gradient flow, which produces motion vectors between corresponding pels across frames of the video data. When a motion vector is coincident with an identified spatial discontinuity, then the invention segmenter 103 determines that a component of interest (salient object) exists.

Other segmentation techniques are suitable for implementing segmenter 103.

Returning to FIG. 1, once the preprocessor 102 (segmenter 103) has determined the components of interest (salient objects) or otherwise segmented the same from the source video signal 101, a normalizer 105 reduces the complexity of the determined components of interest. Preferably, the normalizer 105 removes variance of global motion and pose, global structure, local deformation, appearance, and illumination from the determined components of interest. The normalization techniques previously described in the related patent applications stated herein are utilized toward this end. This results in the normalizer 105 establishing object models, such as a structural model 107 and an appearance model 108 of the components of interest.

The structural object model 107 may be mathematically represented as:

$$SM(\sigma) = \sum_{x,y}[(v_{x,y} + \Delta_t) + Z] \quad \text{Equation 1}$$

where σ is the salient object (determined component of interest) and SM ( ) is the structural model of that object;

$V_{x,y}$ are the 2D mesh vertices of a piece-wise linear regularized mesh over the object σ registered over time discussed above;

$\Delta_t$ are the changes in the vertices over time t representing scaling (or local deformation), rotation and translation of the object between video frames; and Z is global motion.

From Equation 1, a global rigid structural model, global motion, pose, and locally derived deformation of the model can be derived. Known techniques for estimating structure from motion are employed and are combined with motion estimation to determine candidate structures for the structural parts (component of interest of the video frame over time).

This results in defining the position and orientation of the salient object in space and hence provides a structural model 107 and a motion model 111.

The appearance model 108 then represents characteristics and aspects of the salient object which are not collectively modeled by the structural model 107 and the motion model 111. In one embodiment, the appearance model 108 is a linear decomposition of structural changes over time and is defined by removing global motion and local deformation from the structural model 107. Applicant takes object appearance at each video frame and using the structural model 107 and reprojects to a "normalized pose." The "normalized pose" will also be referred to as one or more "cardinal" poses. The reprojection represents a normalized version of the object and produces any variation in appearance. As the given object rotates or is spatially translated between video frames, the appearance is positioned in a single cardinal pose (i.e., the average normalized representation). The appearance model 108 also accounts for cardinal deformation of a cardinal pose (e.g., eyes opened/closed, mouth opened/closed, etc.) Thus appearance model 108 AM (σ) is represented by cardinal pose $P_c$ and cardinal deformation $\Delta_c$ in cardinal pose $P_c$, $$AM(\sigma) = \sum_{t}(P_c + \Delta_c P_c) \quad \text{Equation 2}$$

The pels in the appearance model 108 are preferably biased based on their distance and angle of incidence to camera projection axis. Biasing determines the relative weight of the contribution of an individual pel to the final formulation of a model. Therefore, perferably, this "sampling bias" can factor into all processing of all models. Tracking of the candidate structure (from the structural model 107) over time can form or enable a prediction of the motion of all pels by implication from a pose, motion, and deformation estimates.

Further, with regard to appearance and illumination modeling, one of the persistent challenges in image processing has been tracking objects under varying lighting conditions. In image processing, contrast normalization is a process that models the changes of pixel intensity values as attributable to changes in lighting/illumination rather than it being attributable to other factors. The preferred embodiment estimates a salient object's arbitrary changes in illumination conditions under which the video was captured (i.e., modeling, illumination incident on the object). This is achieved by combining principles from lambertian reflectance linear subspace (LRLS) theory with optical flow. According to the lrls theory, when an object is fixed, preferably, only allowing for illumination changes, the set of the reflectance images can be approximated by a linear combination of the first nine spherical harmonics; thus the image lies close to a 9D linear subspace in an ambient "image" vector space. In addition, the reflectance intensity for an image pixel (x,y) can be approximated as follows.

$$I(x, y) = \sum_{i=0,1,2} \sum_{j=-i, -i+1... i-1, i} l_{ij}b_{ij}(n),$$

using LRLS and optical flow, expectations are computed to determine how lighting interacts with the object. These expectations serve to constrain the possible object motion that can explain changes in the optical flow field. When using LRLS to describe the appearance of the object using illumination modeling, it is still necessary to allow an appearance model to handle any appearance changes that may fall outside of the illumination model's predictions.

Other mathematical representations of the appearance model 108 and structural model 107 are suitable as long as the complexity of the components of interest is substantially reduced from the corresponding original video signal but saliency of the components of interest is maintained. Returning to FIG. 1, PCA/wavelet encoding is then applied to the structural object model 107 and appearance object model 108 by the analyzer 110. More generally, analyzer 110 employs a geometric data analysis to compress (encode) the video data corresponding to the components of interest. The resulting compressed (encoded) video data is usable in the FIG. 2 image processing system. In particular, these object models 107, 108 can be stored at the encoding and decoding sides 232, 236 of FIG. 2. From the structural model 107 and appearance model 108, a finite state machine can be generated. The conventional coding 232 and decoding 236 can also be implemented as a conventional Wavelet video coding decoding scheme.

PCA encoding is applied to the normalized pel data on both sides 232 and 236, which builds the same set of basis vectors on each side 232, 236. In a preferred embodiment, PCA/wavelet is applied on the basis function during image processing to produce the desired compressed video data. Wavelet techniques (DWT) transform the entire image and sub-image and linearly decompose the appearance model 108 and structural model 107 then this decomposed model is truncated gracefully to meet desired threshold goals (ala EZT or SPIHT). This enables scalable video data processing unlike systems/methods of the prior art due to the "normalize" nature of video data.

Figure 2:
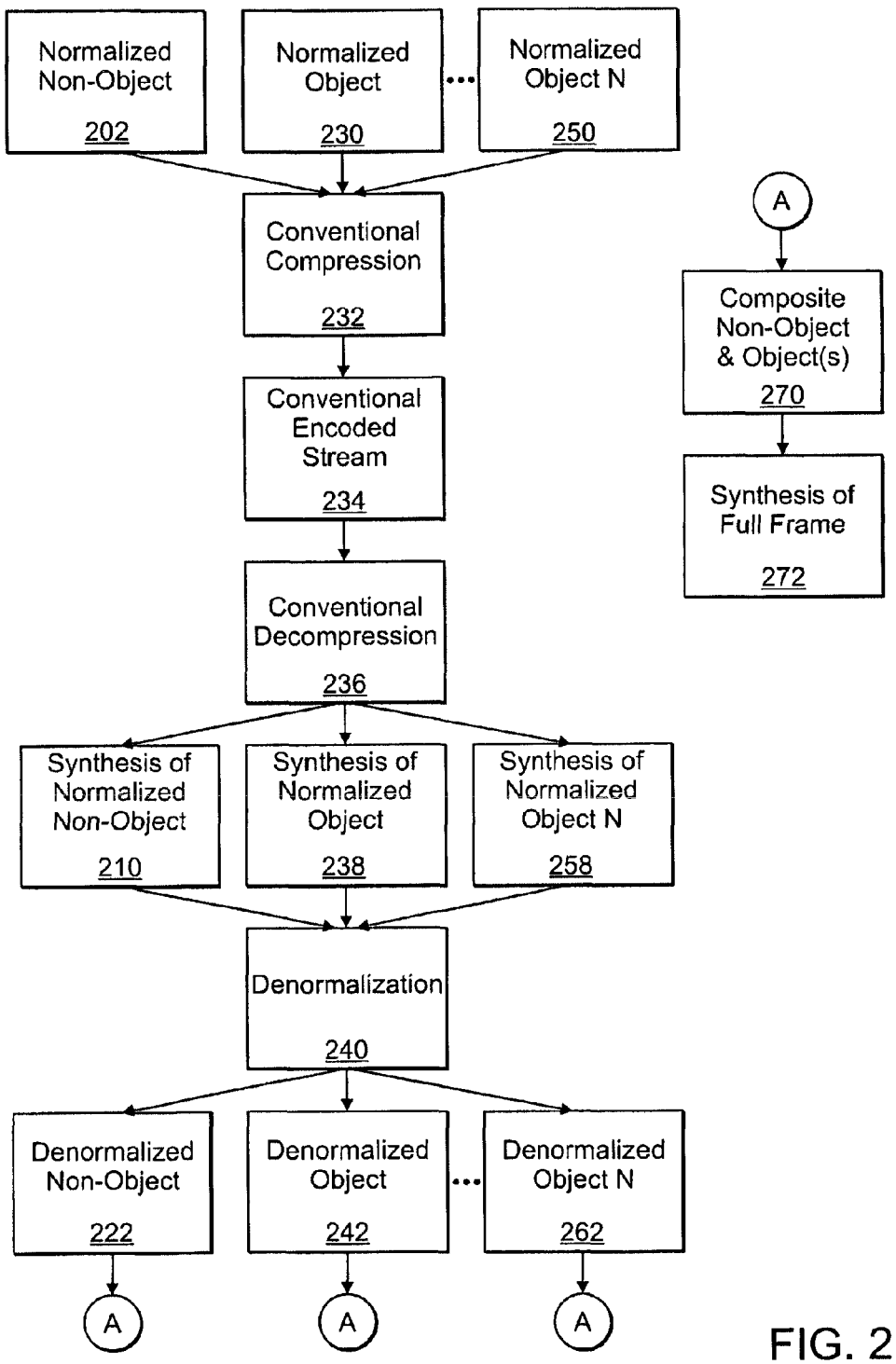
FIG. 2 is a block diagram illustrating the hybrid spatial normalization compression method employed in embodiments of the present invention.

As shown in FIG. 2, the previously detected object instances in the uncompressed video streams for one or more objects 230, 250, are each processed with a separate instance of a conventional video compression method 232. Additionally, the non-object 202 resulting from the segmentation of the objects 230, 250, is also compressed using conventional video compression 232. The result of each of these separate compression encodings 232 are separate conventional encoded streams for each 234 corresponding to each video stream separately. At some point, possibly after transmission, these intermediate encoded streams 234 can be decompressed (reconstructed) at the decoder 236 into a synthesis of the normalized non-object 210 and a multitude of objects 238, 258. These synthesized pels can be de-normalized 240 into their de-normalized versions 222, 242, 262 to correctly position the pels spatially relative to each other so that a compositing process 270 can combine the object and non-object pels into a synthesis of the full frame 272.

Data Mining Object Models

By archiving these object models (e.g. deformation, structure, motion, illumination, and appearance models), persistent forms of these object models can be determined and reused for processing other video streams. For example, when digital video is imported from a camera, the digital video can be transcoded and the video object archive can be accessed to determine whether any of the object models match. Although this can be done on a frame by frame basis, preferably the portions of the video stream or the entire video stream can be analyzed using batch processing by grouping together similar items. The frames can be analyzed in a non-sequential manner, and a statistical analysis can be performed to determine which object models provide the best fit for coding.

Figure 3:
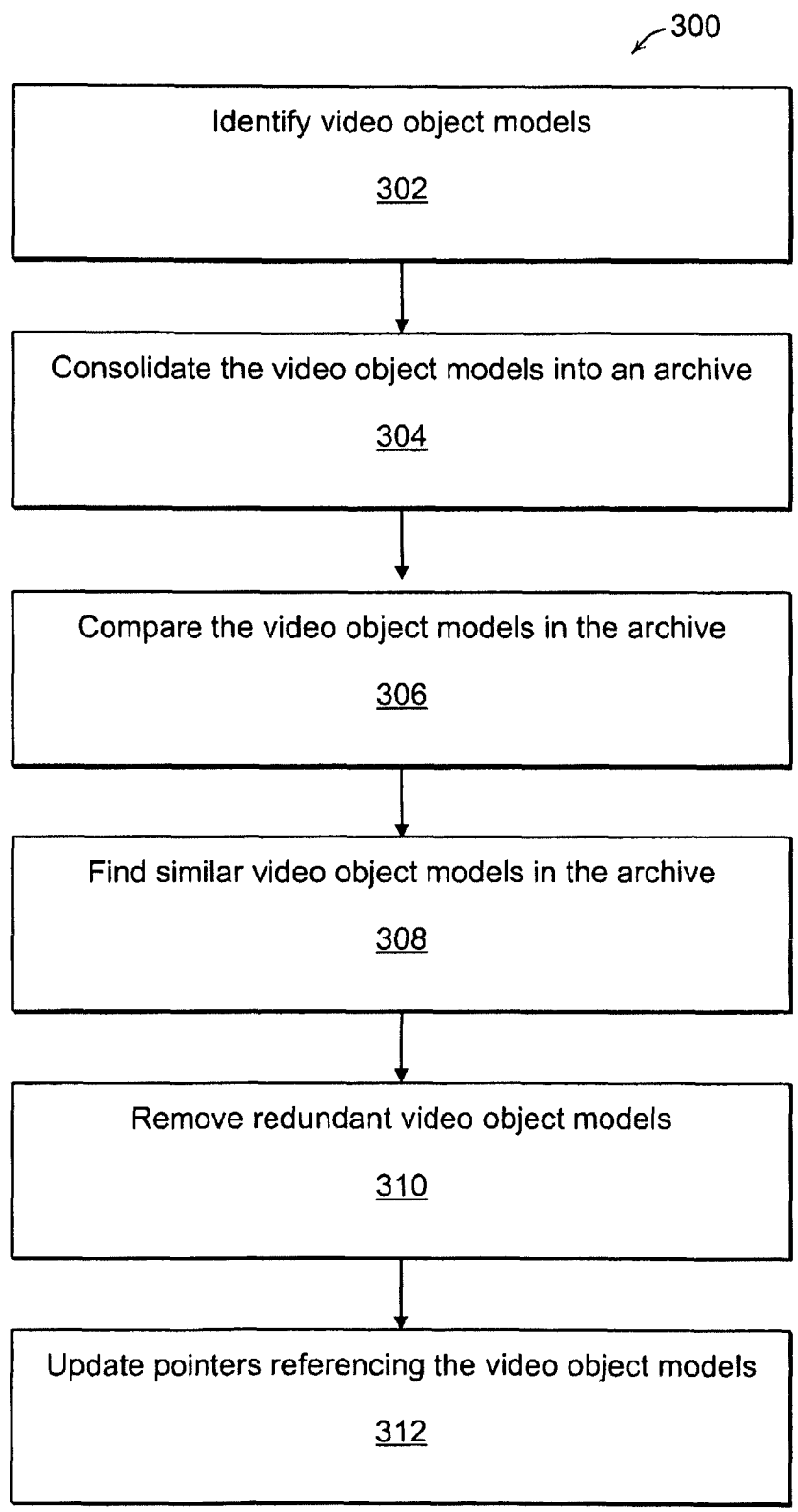
FIG. 3 is a flow diagram illustrating the process for archiving object models in a preferred embodiment.

FIG. 3 is a flow diagram illustrating the process 300 of archiving object models. At step 302, the object models are identified as discussed above. At step 304, the object models are consolidated into an archive or object model library. At step 306, the object models are compared and, at step 308 similar object models are identified. At step 310, the redundant object models can be removed, and similar models can be consolidated. At step 312, pointers/identifiers to the video object models can be updated. Pointers to object models used in an encoded video stream, for example, can be updated to reference the relevant, updated object model in the library.

In this way, the present archival system 300 can mine these object models in the object library and analyze object models to identify similar object models. Once the similar object models are identified, the system 300 can capitalize on the redundancy by creating generic object models that can be used over and over again for processing other video. The similarity tends to be based on similar structure, deformation, motion, illumination, and/or appearance.

The object models can be used for subsequent video processing in any number of ways. As discussed in more detail below, the models can be used in a client/server framework, the object models can be bundled into a package with the video codec for use when decoding encoded video file, the models can be used in connection with a personal video service, and the models can be distributed and made available to many users using a distributed system, such as a peer-to-peer network. Also, the processing of the models can occur in a distributed computing network.

Personal Video Processing Service

Figure 4:
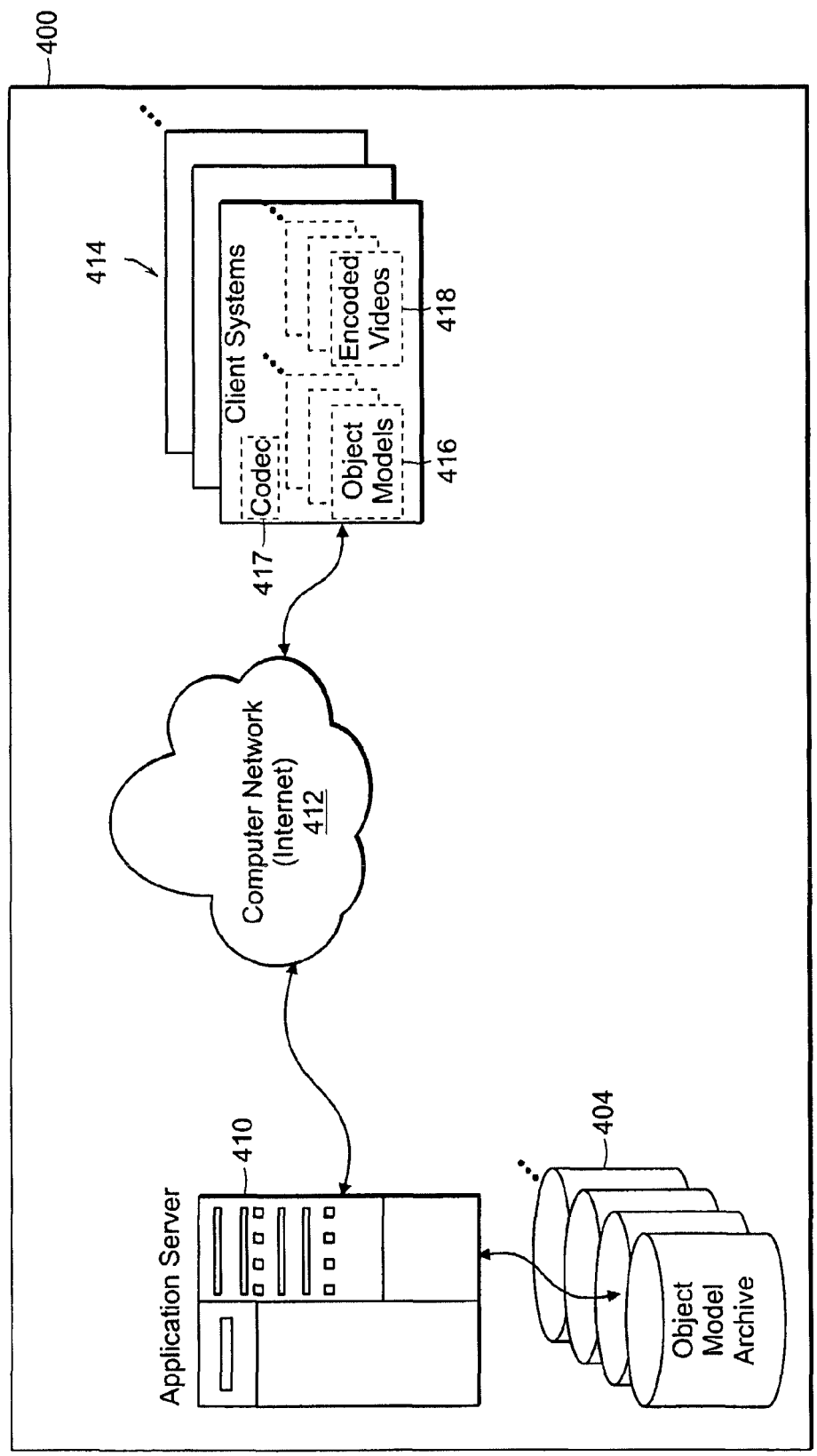
FIG. 4 is a schematic diagram illustrating an example of the architecture of a personal video processing service of the present invention using a client-server framework.

In the example where the object models are stored on a server, a personal video processing service can be provided. FIG. 4 is a diagram illustrating an example of the architecture of a personal video processing service 400 using a client 414 server 410 framework. In this example, a user or member of the personal video service can use the present invention software to transcode all of their video files 418 using object based video compression. During the transcoding process, object models 416 are generated. The object models can be uploaded to an object model library 404 as part of the personal video service. When a member of the service transmits an encoded video file 418 to another member, the file size can be reduced substantially. During playback on the other member's system, the relevant object models 404 can be accessed from the server 410 to process and render the encoded video stream.

The system 400 can analyze the object models uploaded from a particular member and determine whether there are redundant object models. If, for example, the member continually transcodes digital video that depicts the same subjects, e.g. the same faces, same pets, etc., it is likely that the same object models will be created over and over again. The system 400 can capitalize on this redundancy by creating a cache of object models that are personal to the user (e.g. a cache of face object models, pet object models, etc.). The system can further capitalize on this redundancy by creating a codec 417 that is customized and personal to that user. The codec 417 can be bundled with the object models 416 that are particular to that user.

By having a substantial amount of members uploaded their models 416 to the server 410, the models can be analyzed to identify common or similar models. The most commonly used or generated models can be tracked. In this way, the system 400 can learn and determine what models 416 are the most likely to be needed, and a codec can be designed to include only the most important object models.

If a user tries to process an encoded video with the codec and the particular model has not been bundled with that codec, the system can access the server 410 to obtain the necessary models from archive 404. The codec may also access the server 410 periodically to update itself with new and updated object models.

As a further embodiment, the encoded videos could be such that the original "conventional" encoding of the video file is accessible on the client node 414. In this case, the advantage of the processing is used for transmitting the video, while more "conventional" compression is used to store the video on the hard disk to facilitate more conventional processing of the video. For instance, if a video editing application wishes to use a different format, then the present inventive method can primarily be utilized during transmission of the video file.

Tuning the Codec

The codec 417 can be tuned to particular types of encoded video data. For example, if the video stream has a reoccurrence of certain objects, a common theme or particular style throughout, than the object models can be reused when reconstructing the entire encoded video file. Similarly, the codec 417 can be optimized to handle these reoccurring objects, such as faces. Likewise, if the video stream is a movie that has certain characteristics, such as a film of a particular genre, such as action film, than it may use similar object models 416 throughout the film. Even where the digital video is a film noir, for example, which is often characteristic of a low-key black-and-white visual style, then particular lighting and illumination object models may be applicable and used when reconstructing the entire encoded version of the movie. As such, there may be common object models (e.g. structure and illumination models) that are applicable to a substantial portion of the encoded movie. These models can be bundled together to create a customized codec.

Sharing Object Models

Figure 5:
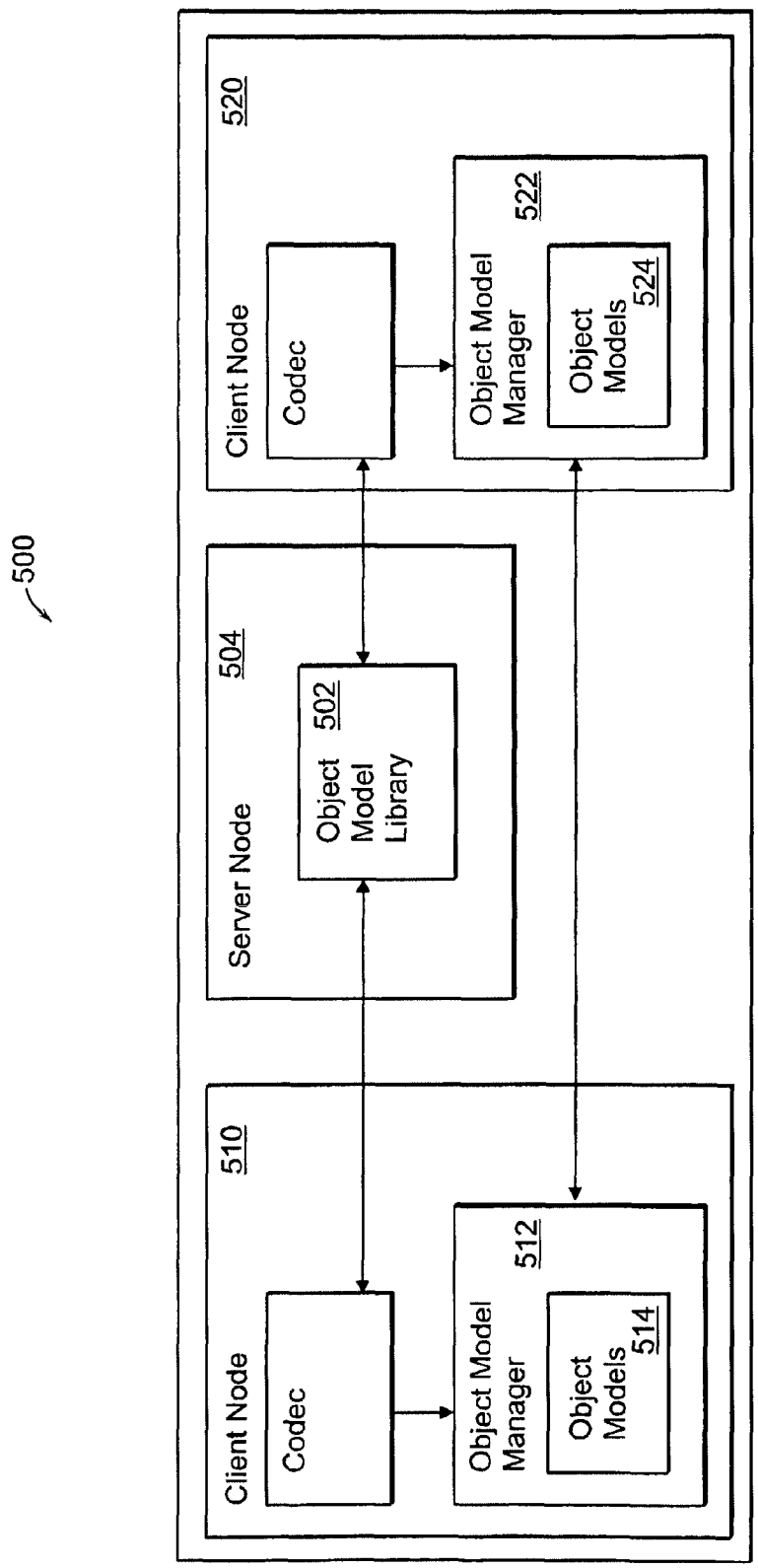
FIG. 5 is a block diagram illustrating the present invention sharing of object models.

The object models could also be shared among any number of users. The object models can be stored on a server or in a database so they can be easily accessed when decoding video files. The object models may be accessed from one user computer to another user computer. FIG. 5 is a block diagram illustrating the sharing of object models. The object models can be accessed from the object model library 502 on the server 504, or they can be accessed from other client systems 510, 520. A respective object model manager 512, 522 can manage the object models 514, 524 that are needed on each client 510, 520 to process the encoded video files. The object model manager is similar to a version control system or source control management system, where the system software manages the ongoing development of the object models 514, 524. Changes to the object models can be identified by incrementing an associated number or letter code (e.g. a revision number or revision level) and associated historically with the change. In this way, the object models 514, 524 can be tracked, as well as any changes to the object models. This electronic tracking of the object models enables the system 500 to control and manage the various copies, versions, of the object models.

In addition to using a client-server framework, object models can be shared and distributed using a peer-to-peer network or other framework. In this way, users can download compressed video files and object models from other users in the peer-to-peer network. For example, if an encoded version of the movie harry potter were being downloaded from one system in the peer-to-peer network, to facilitate efficiency the relevant models, or partitions of those models, could be downloaded from other systems in the network.

Digital Rights Management

The process of deploying security schemes to protect access to digital video is long, involved and expensive. Content users want unfettered access to digital content without being required to undergo a burdensome authentication process. One of the most complicated aspects of developing a security model for deploying content is finding a scheme in which the cost benefit analysis accommodates all participants, i.e. the content user, content provider and software developer. At this time, the currently available schemes do not provide a user-friendly, developer-friendly and financially effective solution to restrict access to digital content.

The object models of the present invention can be used as a way to control access to the encoded digital video. For example, without the relevant object models, a user would not be able to playback the video file. The object models can be used as a key to access the video data. The playback operation the coded video data can depend on a piece of auxiliary information, the object models. This approach makes the encoded video data unreadable without access to the object models.

By controlling access to the object models, access to playback of the content can be controlled. This scheme can provide a user-friendly, developer-friendly solution, and efficient solution to restricting access to video content.

Additionally, the object models can progressively unlock the content. With a certain version of the object models, an encoding might only decode to a certain level, then with progressively more complete object models, the whole video would be unlocked. Initial unlocking might enable thumbnails of the video to be unlocked, giving the user the capability of determining if they want the full video. A user that wants a standard definition version would procure the next incremental version of the object models. Further, the user needing high definition or cinema quality would download yet more complete versions of the object model. Both the encoding and the object models are coded in such a way as to facilitate a progressive realization of the video quality commensurate with encoding size and quality, without redundancy.

Processing Environment

Figure 6:
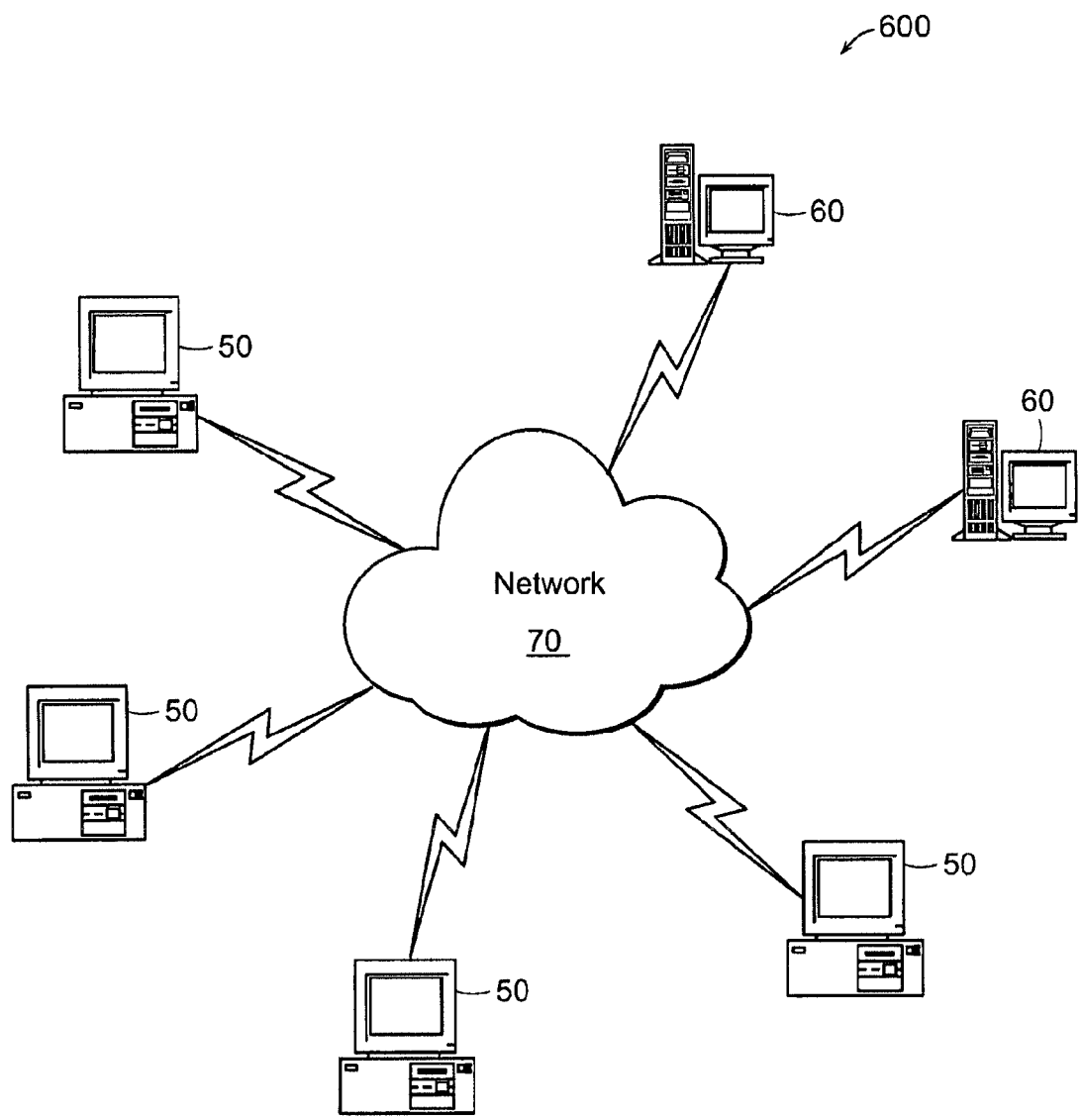
FIG. 6 is a schematic illustration of a computer network or similar digital processing environment in which embodiments of the present invention may be implemented.

FIG. 6 illustrates a computer network or similar digital processing environment 600 in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
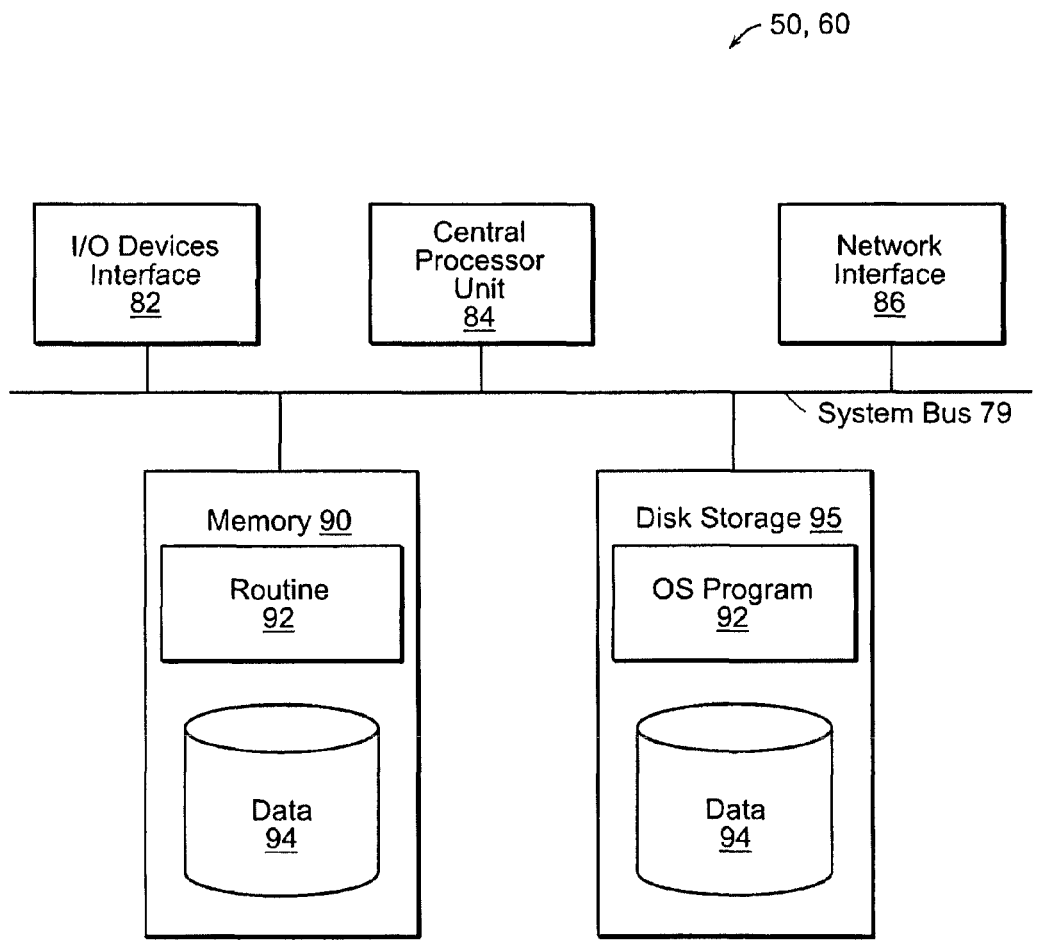
FIG. 7 is a block diagram of the internal structure of a computer of the network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is an Input/Output (I/O) device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., object models, codec and object model library discussed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product, including a computer readable medium (e.g., a removable storage medium, such as one or more DVD-ROM's, CD-ROM's, diskettes, tapes, hard drives, etc.) That provides at least a portion of the software instructions for the invention system. Computer program product can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network, such as the internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product is a propagation medium that the computer system may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 4-7 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Further, in some embodiments, there may be the following advertisement feature.

Embedding Advertisements in the Video Using the Object Models

The object models can be used to cause frames that include advertisements to be inserted into the video stream during playback. In this way, the actual encoded video content would not need to be modified by the advertisements. However, during reconstruction (e.g. playback) of the encoded video, the models can cause frames that provide advertisement to be generated into the playback video stream.

What is claimed is:

1. A system for processing video comprising:
    an object model archive having object models modeling objects from a plurality of initial video files having one or more video frames depicting at least one object, the object model archive being stored at a server; and
    a codec customized to reconstruct compressed video data including one or more video frames, the customized codec configured to provide digital rights management of the compressed video file by:
    locking at least portions of a compressed video file, such that one or more object models from the archive are withheld pending unlocking of the compressed video file;
    transmitting the one or more object models from the server in response to granting playback access to a first computing system associated with a user, where the object models are auxiliary to and separate from the compressed video file; and
    responding to the receipt of the object models from the archive by unlocking the locked portions of the compressed video file, such that playback of the portions of the compressed video file is allowed in response to the object models from the archive being received at the first computing system associated with the user.

2. A system as in claim 1 wherein the object models are created by:
processing a plurality of video files associated with the one or more users;
identifying reoccurring objects in the plurality of video files;
modeling the reoccurring objects using structural or appearance models; and
archiving the object models in the object model archive.

3. A system as in claim 2 wherein the reoccurring objects are filtered based on personalized information regarding the one or more users, where the reoccurring objects are modeled to create the object models.

4. A system as in claim 3 wherein filtering includes prompting a user to make a selection identifying whether the reoccurring objects are salient objects associated with the one or more users.

5. A system as in claim 3 wherein the personalized information includes features related to the one or more users including one or more of the following: human face, human appearance, pet, or accessory.

6. A system as in claim 2 wherein identifying reoccurring objects in the plurality of video files further includes detecting at least one object which appears in a substantial amount of the plurality of video files.

7. A system as in claim 1 further including sharing the archived object models with the one or more users via a communications network.

8. A system as in claim 1 wherein the communications network is a peer-to-peer network, and the archived object models are shared over the peer-to-peer network to facilitate reconstruction of compressed video data.

9. A system as in claim 1 wherein the archived object models are stored at a remote storage, the archived object models being configured for deployment to one or more client devices to facilitate decoding of compressed video data; and
one or more of the client devices are granted access to reconstruct the compressed video data by providing the one or more client devices with the one or more object models from the object model archive.

10. A system as in claim 9 wherein the remote storage location is a server or at temporary storage location.

11. A system as in claim 1 wherein personal video service is provided to a plurality of users, such that personal video service stores the archived object models for the plurality of users to facilitate reconstruction of respective compressed video files from each of the plurality of users.

12. A system as in claim 1 wherein one or more of the archived object models are configured to include advertisements such that when the compressed video data is processed and reconstructed using one or more of the archived object models, one or more of the advertisements are included with the resulting reconstruction.

13. A system as in claim 1 wherein the object models include one or more of deformation model, structure model, or appearance model.

14. A system as in claim 1 wherein the object is associated with the one or more users personally.

15. A system as in claim 1 wherein the at least one object is not associated with the one or more users personally.

16. A system as in claim 1 further including tuning the object model archive by removing redundant object models in the object model archive including:
comparing one or more of the archived object models to determine whether there are substantially equivalent object models stored in the object model archive; and
reducing the size of the archive by eliminating the redundant, substantially equivalent object models.

17. A system as in claim 16 further including consolidating similar object models in the object model archive to reduce the size of the object model archive by:
reducing the size of the archive by combining one or more object models into a common object; and
using the common object, generating one or more reduced original object models.

18. A system as in claim 16 wherein tuning the customized codec further includes removing object models from the object model archive that are unrelated to the one or more users.

19. A system as in claim 1, wherein the object models are used as a key to access a decoded version of encoded video data.

20. A computer implemented method of processing video comprising:
processing one or more object models generated from a plurality of video files having a plurality of frames;
storing the one or more of the object models in an object model archive at a server; and
providing digital rights management of an encoded video file by:
determining that at least portions of the encoded video file are locked, such that one or more object models are being withheld pending unlocking of the encoded video file;
downloading one or more of the withheld object models from the server in response to playback access being granted to a first computing system associated with a user, where the object models are auxiliary to and separate from the encoded video file; and
responding to receipt of the object models by allowing playback of the encoded video file at the first computing system associated with the user.

21. A computer implemented method as in claim 20 wherein the object models are created by:
processing a plurality of video files associated with the one or more users;
identifying reoccurring objects in the plurality of video files;
modeling the reoccurring objects using structural or appearance models; and
archiving the object models in the object model archive.

22. A computer implemented method as in claim 20 wherein the reoccurring objects are filtered based on personalized information regarding the one or more users, where the remaining reoccurring objects are modeled.

23. A computer implemented method as in claim 20 wherein filtering includes prompting a user to make a selection identifying whether the reoccurring objects are salient objects associated with the one or more users.

24. A computer implemented method as in claim 20 wherein the personalized information includes features related to the one or more users including one or more of the following: human face, pet, or accessory.

25. A computer implemented method as in claim 20 wherein identifying reoccurring objects in the plurality of video files further includes detecting at least one object which appears in a substantial amount of the plurality of video files.

26. A computer implemented method as in claim 20 further including sharing the archived object models with the one or more users via a communications network.

27. A computer implemented method as in claim 20 wherein the communications network is a peer-to-peer network, and the archived object models are shared over the peer-to-peer network to facilitate reconstruction of encoded video data.

28. A computer implemented method as in claim 20 wherein the archived object models are stored at a remote storage the archived object models being configured for deployment to one or more client devices to facilitate decoding of encoded video data; and
   one or more of the client devices are granted access to reconstruct the encoded video data by providing the one or more client devices with the one or more object models from the object model archive.

29. A computer implemented method as in claim 28 wherein the remote storage location is a server or at temporary storage location.

30. A computer implemented method as in claim 20 wherein personal video service is provided to a plurality of users, such that personal video service stores archived object models for the plurality of users to facilitate reconstruction of respective encoded video files from each of the plurality of users.

31. A computer implemented method as in claim 20 wherein one or more of the archived object models further include advertisements such that when the encoded video data is processed and reconstructed using one or more of the archived object models, one or more of the advertisements are included with the resulting reconstruction.

32. A computer implemented method as in claim 20 wherein the object models include one or more of deformation model, structure model, or appearance model.

33. A system for processing video comprising:
   an object model archive storing object models generated from initial video files;
   the object model archive being hosted by one or more server systems such that one or more object models in the object model archive are configured to be deployed to one or more client devices to facilitate reconstruction of and digital rights management of compressed video data at the one or more client devices;
   the one or more client devices being configured to provide digital rights management of the compressed video data by:
   restricting playback access of at least portions of a compressed video data by withholding access to one or more object models pending authentication of a user;
   receiving one or more of the withheld object models in response to authenticating the user, where the object models are auxiliary to and separate from the compressed video data; and
   responding to the receipt of the object models by unlocking the locked portions of the compressed video data, such that playback of the portions of the compressed video data is allowed in response to the object models being received.

34. A computer program product having computer readable instructions stored on a non-transitory computer readable medium capable of being executed by one or more computer processors, the computer readable instructions configured to decode encoded video data by:
   processing one or more object models generated from video data to create an object model archive;
   configuring the object model archive for use by one or more server systems such that one or more object models in the object model archive are configured for deployment to one or more client devices to facilitate reconstruction of and digital rights management of encoded video data;
   withholding access to one or more object models pending authentication of one of the client devices;
   in response to one of the client devices attempting to unlock at least a portion of the encoded video data, granting access to reconstruct the encoded video data at one or more of the client devices once authenticated by providing the one or more client devices with the one or more object models from the object model archive, the object models being auxiliary to and separate from the encoded video data, where playback of the portion of the video data is allowed in response to the object models being downloaded to the one or more client devices.

\* \* \* \* \*